(12) United States Patent
Shigetomi

(10) Patent No.: US 9,118,244 B2
(45) Date of Patent: Aug. 25, 2015

(54) POWER SUPPLY APPARATUS AND IMAGE FORMING APPARATUS INCLUDING THE SAME

(71) Applicant: KYOCERA Document Solutions Inc., Osaka-shi, Osaka (JP)

(72) Inventor: Masayuki Shigetomi, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/137,056

(22) Filed: Dec. 20, 2013

(65) Prior Publication Data

US 2014/0176978 A1 Jun. 26, 2014

(30) Foreign Application Priority Data

Dec. 26, 2012 (JP) ................................. 2012-282281

(51) Int. Cl.
| | |
|---|---|
| *G06F 15/00* | (2006.01) |
| *G06F 3/12* | (2006.01) |
| *G06K 1/00* | (2006.01) |
| *H02M 3/156* | (2006.01) |
| *G03G 15/00* | (2006.01) |
| *H02M 1/00* | (2007.01) |

(52) U.S. Cl.
CPC ........... *H02M 3/156* (2013.01); *G03G 15/5004* (2013.01); *H02M 2001/0025* (2013.01); *H02M 2001/0032* (2013.01); *Y02B 70/16* (2013.01)

(58) Field of Classification Search
CPC ..................... H02M 3/156; H02M 2001/0025; Y02B 70/16; G06K 15/02; G06F 3/1297
USPC .................. 358/1.1, 1.13, 1.14, 1.15
See application file for complete search history.

(56) References Cited

U.S. PATENT DOCUMENTS

| | | | |
|---|---|---|---|
| 6,222,746 B1 * | 4/2001 | Kim | ................................. 363/89 |
| 2007/0001513 A1 | 1/2007 | Noda | |
| 2011/0150521 A1 | 6/2011 | Uchiyama et al. | |
| 2012/0268085 A1 | 10/2012 | Lee et al. | |
| 2012/0314454 A1 * | 12/2012 | Hosotani | ..................... 363/21.01 |

FOREIGN PATENT DOCUMENTS

| | | |
|---|---|---|
| CN | 102104337 A | 6/2011 |
| CN | 102751872 A | 10/2012 |
| JP | S60135080 U | 9/1985 |
| JP | 2007011709 A | 1/2007 |
| JP | 2010088143 A | 4/2010 |
| JP | 2010246294 A | 10/2010 |
| JP | 2012114978 A | 6/2012 |

* cited by examiner

*Primary Examiner* — Douglas Tran
(74) *Attorney, Agent, or Firm* — Alleman Hall McCoy Russell & Tuttle LLP

(57) ABSTRACT

A power supply apparatus controls an output voltage based on a difference between a predetermined reference voltage and a feedback voltage obtained from the output voltage. The power supply apparatus includes a feedback voltage adjustment circuit. The feedback voltage adjustment circuit is configured to gradually reduce or increase the feedback voltage by a predetermined amount, when a condition for increasing or reducing the output voltage to a target value is satisfied.

6 Claims, 7 Drawing Sheets

US 9,118,244 B2

POWER SUPPLY APPARATUS AND IMAGE FORMING APPARATUS INCLUDING THE SAME

INCORPORATION BY REFERENCE

This application is based upon and claims the benefit of priority from the corresponding Japanese Patent Application No. 2012-282281 filed on Dec. 26, 2012, the entire contents of which are incorporated herein by reference.

BACKGROUND

The present disclosure relates to power supply apparatuses that control an output voltage based on a difference between a predetermined reference voltage and a feedback voltage obtained from the output voltage, and image forming apparatuses including the power supply apparatuses.

Image forming apparatuses, such as copy machines, printers, and facsimile apparatuses, operate in one of a normal operation mode and a power saving mode (also referred to as a sleep mode). The normal operation mode represents an operation mode in which the image forming apparatus is on standby so as to operate immediately when a print instruction is inputted. The power saving mode represents an operation mode in which the image forming apparatus is on standby so as to reduce power consumption of the apparatus by supplying power to a part of components. For example, in a case where a standby time period from power-on to input of a print instruction is shorter than or equal to a predetermined time period, the image forming apparatus operates in the normal operation mode in which power is supplied to all of load devices. On the other hand, in a case where the standby time period is longer than the predetermined time period, the image forming apparatus is controlled so as to shift from the normal operation mode to the power saving mode after elapse of the predetermined time period, and supply power to a part of the load devices.

When the image forming apparatus is caused to shift from the power saving mode to the normal operation mode, increase of loads causes abrupt increase of load current, to reduce voltage, whereby operations of the load devices may become unstable. For example, when an output voltage from a power supply device of the image forming apparatus becomes lower than a rated voltage of a load device due to the reduction in voltage, the load device may not operate. On the other hand, when the image forming apparatus is caused to shift from the normal operation mode to the power saving mode, reduction of the loads causes abrupt reduction of load current, whereby voltage may be excessively increased. Also in this case, operations of the load devices may become unstable. Therefore, to date, feedback control has been performed in which, for power supply devices of image forming apparatuses, feedback of an output voltage outputted to a power supply path for a load device is performed, and power supply is controlled so as to reduce a difference between the voltage (feedback voltage) and a predetermined reference voltage.

In order to realize further reduction of power consumption, the image forming apparatus may be designed such that, when the image forming apparatus shifts to the power saving mode as described above, driving voltage for a calculation device such as a CPU used in the image forming apparatus is reduced. However, if a power supply device is structured to perform control for reducing the driving voltage of the calculation device, in addition to the feedback control, a power supply circuit of the power supply device is complicated. Further, a commercially available DC/DC converter is an IC in which a rectifier circuit, a switching circuit, and a feedback control circuit are integrated with each other, and therefore it is difficult to incorporate, in the DC/DC converter, a circuit for reducing driving voltage of the calculation device.

SUMMARY

A power supply apparatus according to one aspect of the present disclosure controls an output voltage based on a difference between a predetermined reference voltage and a feedback voltage obtained from the output voltage. The power supply apparatus includes a feedback voltage adjustment circuit. The feedback voltage adjustment circuit is configured to gradually reduce or increase the feedback voltage by a predetermined amount, when a condition for increasing or reducing the output voltage to a target value is satisfied.

An image forming apparatus according to another aspect of the present disclosure includes a power supply apparatus and an image forming portion. The power supply apparatus is configured to control an output voltage based on a difference between a predetermined reference voltage and a feedback voltage obtained from the output voltage. The image forming portion is configured to perform image formation on a recording medium. The power supply apparatus includes a feedback voltage adjustment circuit. The feedback voltage adjustment circuit is configured to gradually reduce or increase the feedback voltage by a predetermined amount, when a condition for increasing or reducing the output voltage to a target value is satisfied.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings as appropriate. The embodiment described below represents an exemplary implementation of the present disclosure, and the technical scope of the present disclose is not limited by the embodiment described below.

[Schematic Structure of Multifunction Peripheral X]

Firstly, with reference to FIG. 1, schematic structures of a power supply apparatus 30 (an example of a power supply apparatus of the present disclosure) and a multifunction peripheral X (an example of an image forming apparatus of the present disclosure) including the power supply apparatus 30, according to an embodiment of the present disclosure, will be described.

Figure 1:
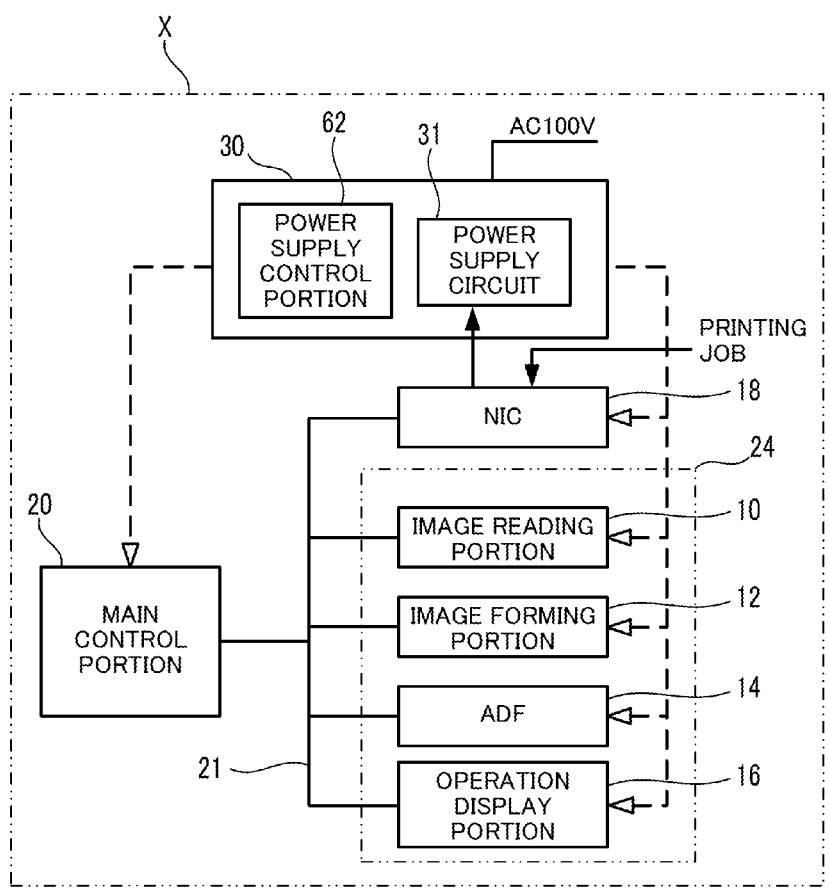
FIG. 1 is a block diagram schematically illustrating a structure of a multifunction peripheral according to an embodiment of the present disclosure.

As shown in FIG. 1, the multifunction peripheral X includes an image reading portion 10, an image forming portion 12, an ADF (automatic document feeder) 14, an operation display portion 16, an NIC (network interface card) 18, such as a communication interface card, which complies with the IEEE802.3 standard, and a main control portion 20 that controls those components. Further, the multifunction peripheral X includes the power supply apparatus 30 that supplies required power to the image reading portion 10, the image forming portion 12, the operation display portion 16, the NIC 18, the main control portion 20, and the like. In the present embodiment, the multifunction peripheral X is illustrated as an example of the image forming apparatus of the present disclosure. However, the image forming apparatus is not limited thereto. The image forming apparatus of the present disclosure may be, for example, a printer, a facsimile apparatus, or a copy machine. Further, in the present embodiment, the power supply apparatus 30 is used for the image forming apparatus. However, the power supply apparatus 30 may be also applicable to various types of devices other than the image forming apparatuses, that is, to, for example, information processing apparatuses such as personal computers, multifunctional mobile terminals called smartphones, and mobile tablet terminals.

The image reading portion 10 is a so-called a scanner that includes a contact glass, a reading unit, a mirror, an optical lens, a CCD, and the like. The image reading portion 10 executes an image reading process for reading image data from a document sheet set at a predetermined position. Specifically, after a document sheet is placed on the contact glass, when a document sheet reading instruction is inputted from the operation display portion 16, the reading unit is moved in the secondary scanning direction, and continuously applies, while moving, one line of light sequentially. Light reflected by the document sheet is guided to the CCD through the mirror and the optical lens, and light amount data based on an amount of light received by the CCD is outputted to the main control portion 20. In the main control portion 20, image data of the document sheet is generated based on the light amount data.

The image forming portion 12 executes an image forming process (printing process) by electrophotography according to image data read by the image reading portion 10 or a printing job inputted through the NIC 18 from an external information processing apparatus such as a personal computer. The image forming portion 12 includes a photosensitive drum, a charging device, a developing device, a transfer device, a fixing device, a laser scanner unit, and the like. When a printing job is inputted through the NIC 18, the photosensitive drum is uniformly charged at a predetermined potential by the charging device. Subsequently, light based on image data included in the printing job is applied to the surface of the photosensitive drum by the laser scanner unit. Thus, an electrostatic latent image is formed on the surface of the photosensitive drum. The electrostatic latent image on the photosensitive drum is developed (visualized) into a toner image by the developing device. Subsequently, the toner image formed on the photosensitive drum is transferred to a print sheet by the transfer device. Thereafter, the toner image is fused and fixed onto the print sheet by the fixing device. In the present embodiment, an exemplary case is described where the image forming portion 12 uses electrophotography. However, the image forming portion 12 is not limited to an image forming portion using electrophotography, and may be an image forming portion using an inkjet recording mode, or an image forming portion using another recording mode or printing mode.

The NIC 18 is a communication interface card that operates to receive input of a printing job from an external information processing apparatus via, for example, a network such as the Internet and an LAN which complies with the IEEE802.3 standard. When the NIC 18 receives a printing job via, for example, a wired or wireless data transmission medium from the information processing apparatus, the NIC 18 outputs a reception signal representing the reception, to a power supply control portion 62 of the power supply apparatus 30.

The main control portion 20 controls an operation of the multifunction peripheral X. The main control portion 20 is structured as a control board in which a microcomputer including, as main components, a CPU, a ROM, a RAM, and an EEPROM is mounted. Further, to the main control portion 20, not-illustrated control devices such as a motor driver and a liquid crystal display controller are also mounted. As shown in FIG. 1, to the main control portion 20, the image reading portion 10, the image forming portion 12, the operation display portion 16, the NIC 18, and the like are electrically connected via an internal bus 21. The main control portion 20 comprehensively controls the multifunction peripheral X by a predetermined control program stored in the ROM being executed by the CPU. The main control portion 20 may be structured as an electronic circuit such as an integrated circuit (ASIC, DSP).

[Structure of Power Supply Apparatus 30]

The power supply apparatus 30 supplies power required by the components, of the multifunction peripheral X, such as the main control portion 20, the image reading portion 10, the ADF 14, the image forming portion 12, the operation display portion 16, and the NIC 18. As shown in FIG. 1, the power supply apparatus 30 is connected to the main control portion 20, the image reading portion 10, the ADF 14, the image forming portion 12, the operation display portion 16, and the NIC 18 via a power supply cable (see the dashed line in FIG. 1), such that power can be supplied to each of the components from the power supply apparatus 30. Hereinafter, for simplification of description, the main control portion 20, the image reading portion 10, the ADF 14, the image forming portion 12, and the operation display portion 16 are collectively referred to as a drive portion 24.

Figure 2:
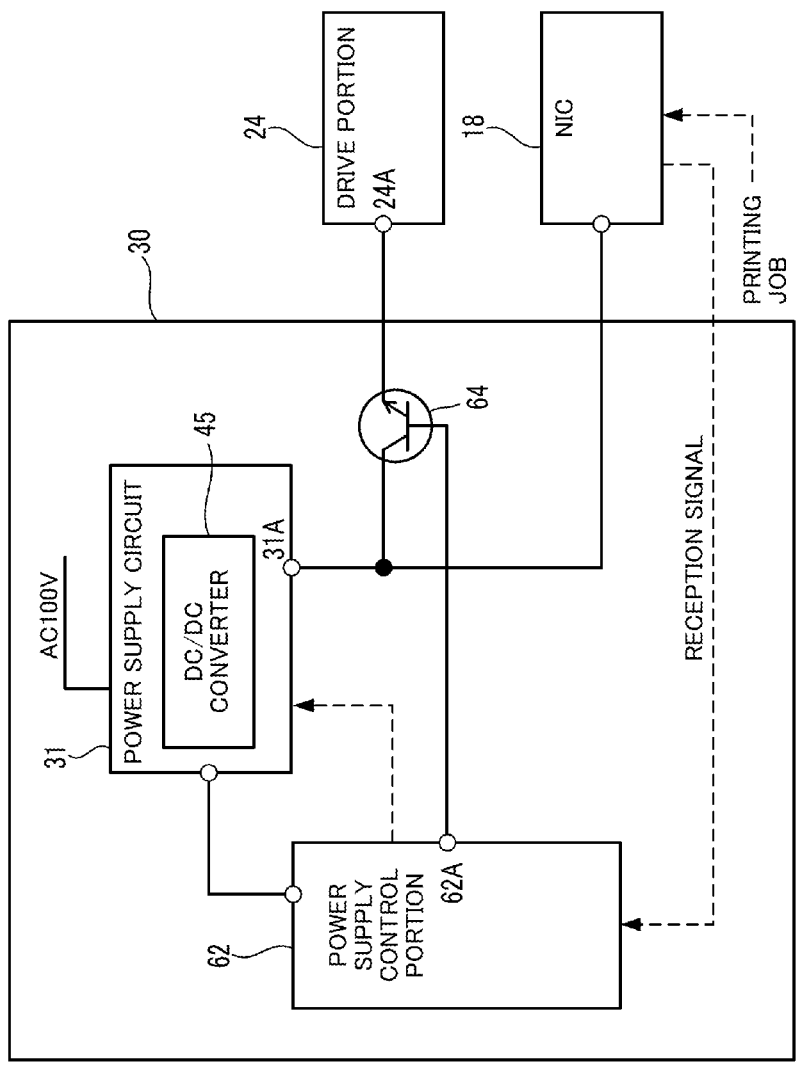
FIG. 2 is a block diagram illustrating a structure of a power supply apparatus according to the embodiment of the present disclosure.

As shown in FIG. 2, the power supply apparatus 30 includes a power supply circuit 31, the power supply control portion 62, and a transistor 64. In the present embodiment, a power supply switching portion and a driving signal output portion of the present disclosure are implemented by the power supply control portion 62.

The power supply circuit 31 rectifies AC100V commercial electric power to DC24V power, and performs switching control to supply the DC24V power to each component such as the main control portion 20 and the image forming portion 12. The structure of the power supply circuit 31 will be described below.

The power supply control portion 62 is structured as a control board in which a microcomputer including, as main components, a CPU, a ROM, a RAM, and an EEPROM is mounted. To the power supply control portion 62, a reception signal is inputted from the NIC 18. When the reception signal is inputted to the power supply control portion 62, a predetermined control program stored in the ROM is executed by the CPU to switch an operation mode of the multifunction peripheral X to one of the normal operation mode and the power saving mode described below. Specifically, when the multifunction peripheral X receives the reception signal in the power saving mode, the power supply control portion 62 switches the operation mode of the multifunction peripheral X from the power saving mode to the normal operation mode. The power supply control portion 62 may be structured as an electronic circuit such as an integrated circuit (ASIC, DSP).

The power supply control portion 62 controls supply of power from the power supply circuit 31 to the NIC 18 or the drive portion 24. Specifically, the power supply control portion 62 performs control for switching the operation mode of the multifunction peripheral X between the normal operation mode and the power saving mode. The normal operation mode represents an operation mode in which power is supplied from the power supply circuit 31 to the NIC 18 and the drive portion 24 to operate the NIC 18 and the drive portion 24. On the other hand, the power saving mode represents an operation mode in which power is supplied to only the NIC 18 from the power supply circuit 31 to operate the NIC 18. In the power saving mode, power saving effect is higher than that of the normal operation mode. In the present embodiment, when the reception signal is inputted to the power supply control portion 62 in the power saving mode, the operation mode is shifted to the normal operation mode. On the other hand, when the multifunction peripheral X is not operated for a predetermined time period in the normal operation mode, or when a printing job is not inputted for a predetermined time period in the normal operation mode, it is determined that a condition for shifting to the power saving mode is satisfied, and the operation mode is immediately shifted to the power saving mode. Sensors which mechanically operate, or the like, may be provided in the ADF 14 and the operation display portion 16, and, when it is determined, by the detection by the sensors, that the ADF 14 and the operation display portion 16 are operated, detection signals associated with the detection may be outputted to the power supply control portion 62. In this case, when receiving the detection signals from the sensors, the power supply control portion 62 switches the power saving mode to the normal operation mode.

When the multifunction peripheral X operates in the normal operation mode, power is constantly supplied to the NIC 18, the power supply control portion 62, and the drive portion 24. Therefore, when a printing job or a document sheet reading instruction is inputted, the image forming process or the image reading process is immediately executed. On the other hand, in a case where the multifunction peripheral X operates in the power saving mode, after a printing job or a document sheet reading instruction is inputted, power is supplied to the drive portion 24. Therefore, a waiting time period in which the image forming portion 12 and the image reading portion 10 become capable of operating, is required. After elapse of the waiting time period, the image forming process or the image reading process is executed.

The transistor 64 causes a power supply path to be conductive or non-conductive. Through the power supply path, power is supplied from the power supply circuit 31 to the drive portion 24. A collector of the transistor 64 is connected to an output terminal 31A of the power supply circuit 31, an emitter of the transistor 64 is connected to an input terminal 24A of the drive portion 24, and a base of the transistor 64 is connected to a signal output terminal 62A of the power supply control portion 62. Further, the power supply circuit 31 is connected to the NIC 18 and the power supply control portion 62 via the power supply path, to constantly supply power to the NIC 18 and the power supply control portion 62 from the power supply circuit 31. In the present embodiment, when receiving the reception signal, the power supply control portion 62 determines that a condition for shifting from the power saving mode to the normal operation mode is satisfied, and the power supply control portion 62 outputs a HIGH level control signal through the signal output terminal 62A to the base of the transistor 64. When the HIGH level control signal is outputted through the signal output terminal 62A by the power supply control portion 62, the signal is inputted to the base of the transistor 64 to connect between the collector and the emitter of the transistor 64. Thus, power is supplied from the power supply circuit 31 to the drive portion 24 as well as the NIC 18. On the other hand, when a printing job is not inputted for a predetermined time period, the power supply control portion 62 determines that a condition for shifting from the normal operation mode to the power saving mode is satisfied, and the collector and the emitter of the transistor 64 are disconnected from each other. Thus, supply of power from the power supply circuit 31 to the drive portion 24 is stopped. Namely, in the present embodiment, when the multifunction peripheral X is in the normal operation mode, the transistor 64 becomes conductive, whereas when the multifunction peripheral X is in the power saving mode, the transistor 64 becomes non-conductive.

As shown in FIG. 2, a gate signal by which an FET switch 49A of a feedback voltage adjustment circuit 49 as described below is driven is outputted from the power supply control portion 62 to the power supply circuit. When receiving the reception signal from the NIC 18, the power supply control portion 62 sets the gate signal to HIGH level so as to cause the FET switch 49A to be on. On the other hand, when a printing job is not inputted for a predetermined time period, the power supply control portion 62 sets the gate signal to LOW level so as to cause the FET switch 49A to be off.

[Schematic Structure of Power Supply Circuit 31]

Figure 3:
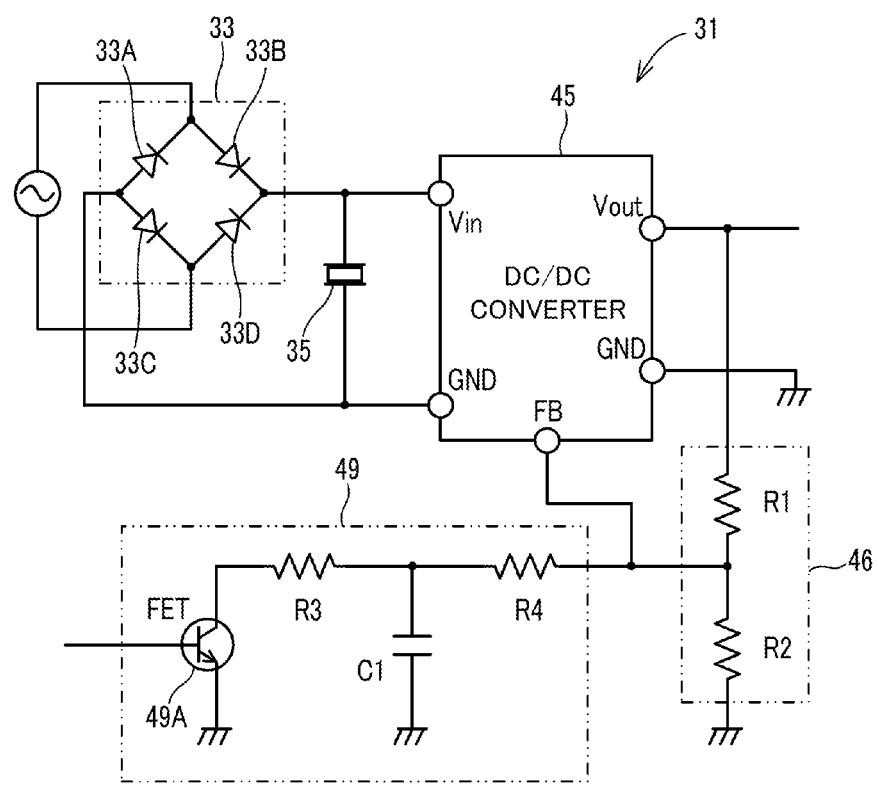
FIG. 3 is a circuit diagram illustrating a structure of a power supply circuit of the power supply apparatus shown in FIG. 2.

Hereinafter, a schematic structure of the power supply circuit 31 will be described with reference to FIG. 3 and FIG. 4. As shown in FIG. 3, the power supply circuit 31 includes a rectifier circuit 33, an electrolytic capacitor 35, a DC/DC converter 45, a voltage dividing circuit 46 (an example of a voltage dividing circuit of the present disclosure), and the feedback voltage adjustment circuit 49 (an example of a feedback voltage adjustment circuit of the present disclosure).

As shown in FIG. 3, the rectifier circuit 33 is a diode bridge circuit that includes four diodes 33A to 33D, and rectifies an alternating current (for example, AC100V) inputted as commercial electric power from the outside, to pulsating current flowing in one direction. The direct current obtained by rectification in the rectifier circuit 33 is subjected to smoothing process by the electrolytic capacitor 35, to obtain direct current with enhanced stability.

Figure 4:
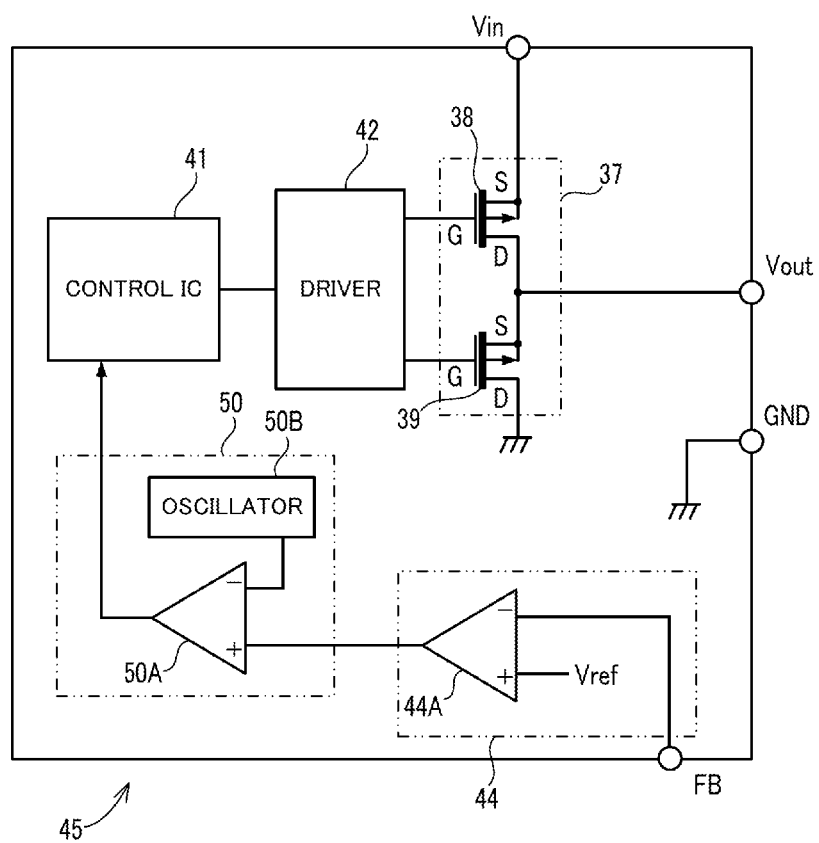
FIG. 4 is a circuit diagram illustrating a structure of a DC/DC converter of the power supply circuit shown in FIG. 3.

As shown in FIG. 4, the DC/DC converter 45 includes a control IC 41, a driver 42, a switching circuit 37 (an example of a switching circuit of the present disclosure), a feedback control circuit 44, and a PWM circuit 50.

The switching circuit 37 includes a switching element 38, and a switching element 39 connected in parallel with the switching element 38. Specifically, the switching elements 38 and 39 are each a power MOSFET that is a voltage drive element. Each of the switching elements 38 and 39 includes three terminals, that is, a gate terminal, a drain terminal, and a source terminal.

The switching elements 38 and 39 are caused to be on or off by the control IC 41, whereby a path for direct current obtained by smoothing by the electrolytic capacitor 35 is intermittently opened or closed, to output power to a power supply path for load devices. The control IC 41 outputs control signals individually to the gate terminals of the switching elements 38 and 39 through signal lines, respectively. In the present embodiment, the switching circuit 37 including two switching elements, that is, the switching elements 38 and 39, is illustrated. However, the switching circuit 37 may be structured such that one switching element is caused to be on or off to output power.

The control IC 41 receives a PWM signal (corresponding to a switching control signal of the present disclosure) outputted from the PWM circuit 50, and outputs the PWM signal to the driver 42. Further, the control IC 41 outputs a frequency selection signal to an oscillator 50B of the PWM circuit 50, and causes the oscillator 50B to output a triangle wave of a frequency based on the frequency selection signal. The driver 42 drives the switching element 38 or the switching element 39 based on the PWM signal. Specifically, the driver 42 outputs the PWM signal to the gate terminals of the switching elements 38 and 39.

The feedback control circuit 44 compares a feedback voltage inputted through an input terminal FB with a predetermined reference voltage Vref by using an error amplifier 44A, and detects an error therebetween, to perform feedback control such that the feedback voltage conforms to the reference voltage Vref. To the error amplifier 44A, the feedback voltage and the reference voltage Vref are inputted.

The PWM circuit 50 converts (modulates) an amplitude of the inputted voltage so as to have a constant pulse width, and includes a PWM comparator 50A and the oscillator 50B that outputs a triangle wave signal of a predetermined frequency. A voltage signal outputted from the error amplifier 44A is inputted to the PWM comparator 50A. Further, the triangle wave signal outputted from the oscillator 50B is inputted to the PWM comparator 50A. The PWM circuit 50 compares the voltage signal inputted from the error amplifier 44A with the amplitude of the triangle wave signal, to generate and output a PWM signal by which the power MOSFET is driven. The frequency of the PWM signal corresponds to the frequency of the triangle wave signal outputted from the oscillator 50B. By the PWM signal, the switching circuit 37 is caused to be on or off, thereby controlling an output voltage.

As shown in FIG. 3, the voltage dividing circuit 46 divides an output voltage of an output terminal Vout of the DC/DC converter 45, to output the result as the feedback voltage to the input terminal FB of the DC/DC converter 45. The voltage dividing circuit 46 includes a voltage dividing resistor R1 and a voltage dividing resistor R2. The voltage dividing resistor R1 is connected to the output terminal Vout, and the voltage dividing resistor R2 is connected between the voltage dividing resistor R1 and a ground potential (corresponding to a reference potential of the present disclosure). The feedback voltage is extracted from a secondary side of the voltage dividing resistor R1.

The feedback voltage adjustment circuit 49 gradually reduces or increases the feedback voltage by a predetermined amount when a condition for increasing or reducing an output voltage of the output terminal Vout of the DC/DC converter 45 to a predetermined target value is satisfied. The condition for increasing the output voltage to the target value represents a condition for shifting an operation mode of the multifunction peripheral X from the power saving mode to the normal operation mode. Specifically, when the reception signal is inputted to the power supply control portion 62, the condition is satisfied. On the other hand, the condition for reducing the output voltage to the target value represents a condition for shifting an operation mode of the multifunction peripheral X from the normal operation mode to the power saving mode. Specifically, when a printing job is not inputted for a predetermined time period, the condition is satisfied.

The feedback voltage adjustment circuit 49 reduces or increases the feedback voltage by the predetermined amount over a time period longer than or equal to the cycle of the PWM signal. The feedback voltage adjustment circuit 49 includes a resistor R4 (an example of a first resistor element of the present disclosure), a capacitor C1 (an example of a capacitor element of the present disclosure), a resistor R3 (an example of a second resistor element of the present disclosure), and the FET switch 49A (an example of a switching element of the present disclosure). The resistor R4 is connected in a path on the secondary side of the voltage dividing resistor R1 so as to be in series with the voltage dividing resistor R1. The capacitor C1 is connected between the resistor R4 and the ground potential. The resistor R3 is connected in parallel with the capacitor C1, and is connected to the resistor R4. The FET switch 49A is connected between the resistor R3 and the ground potential.

The FET switch 49A is a FET or MOSFET, and is a switching element that can reduce voltage on the FET switch 49A side of the resistor R3, to the ground potential, when the FET switch 49A is on. Instead of the FET switch 49A, for example, an open-drain comparator which has a switching function may be used. However, a switching device, such as a transistor, in which voltage is generated between a collector and an emitter is not suitable since error is large.

Figure 5A:
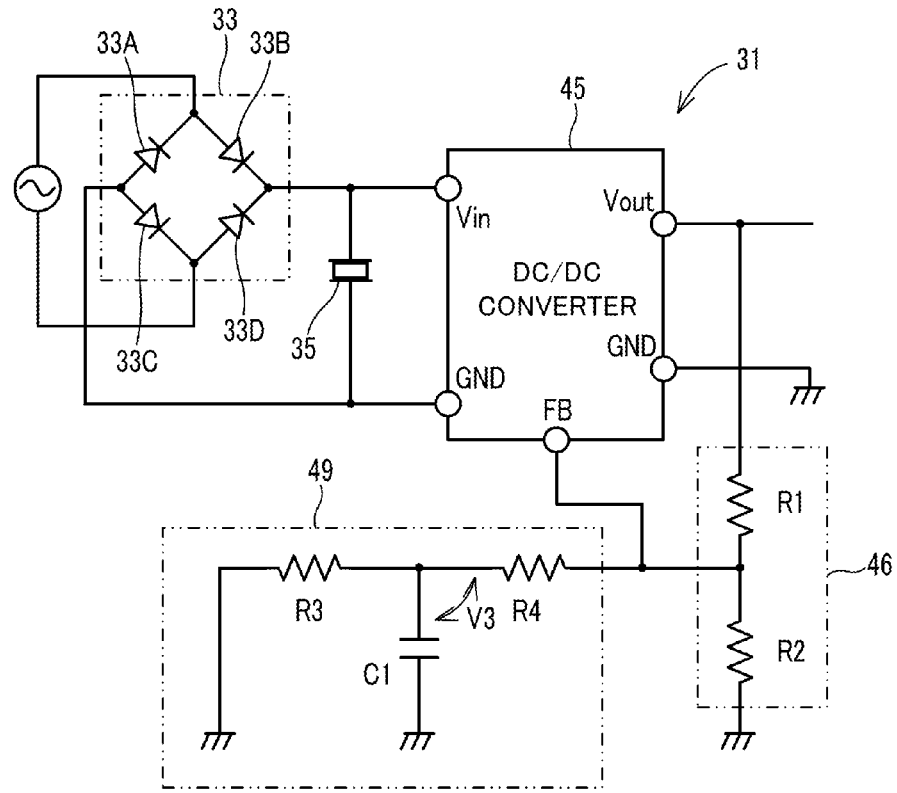
FIGS. 5A and 5B illustrate an equivalent circuit of a feedback voltage adjustment circuit in the power supply circuit shown in FIG. 3, and an output voltage waveform.
Figure 5B:
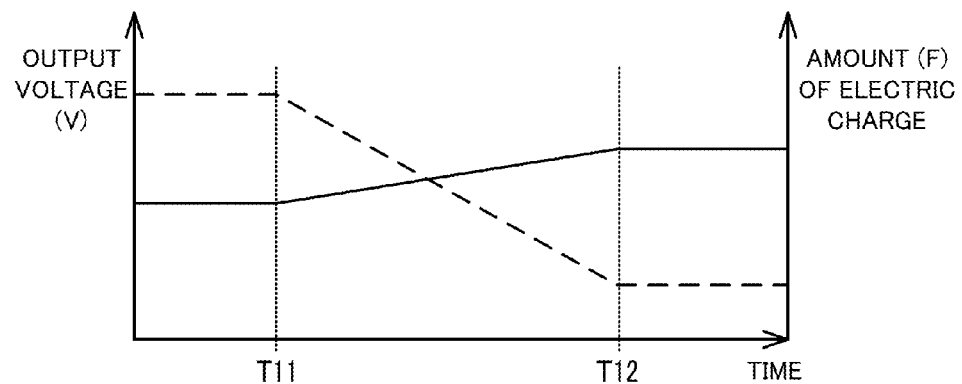

When a HIGH level gate signal is inputted to the gate terminal of the FET switch 49A from the power supply control portion 62, the FET switch 49A is turned on, and the resistor R3 is connected to the ground potential as indicated in the equivalent circuit in FIG. 5A. Thus, electric charge stored in the capacitor C1 moves through the resistor R3 to the ground potential, and is gradually reduced. At this time, a rate at which the electric charge in the capacitor C1 is reduced, is determined according to time constants of the capacitor C1 and the resistor R3. Thus, as shown in FIG. 5B, in a time period from time T11 to time T12, the feedback voltage inputted through the input terminal FB is gradually slowly reduced, to finally converge to a voltage obtained by division by the voltage dividing resistor R1 and a combined resistance R3/(R3+R4). On the other hand, the output voltage slowly increases with stability.

Figure 7A:
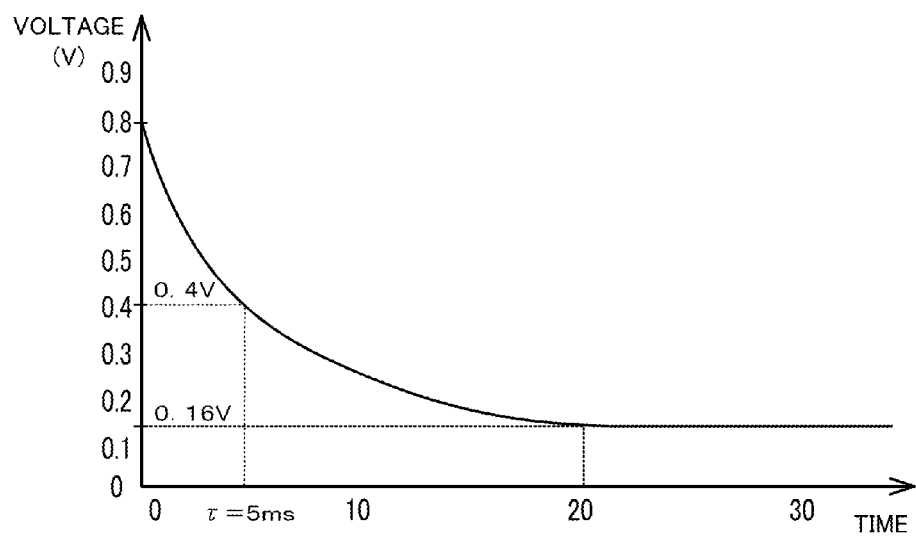
FIGS. 7A and 7B illustrate a voltage characteristic representing a relationship between a time and a voltage at a resistor R4.

One example is assumed where the input voltage of the DC/DC converter 45 is 5V, the value of the voltage dividing resistor R1 is 13 kΩ, the value of the voltage dividing resistor R2 is 100 kΩ, the value of the resistor R3 is 50 kΩ, the value of the resistor R4 is 200 kΩ, the capacitor C1 is 0.1 µF, the reference voltage Vref is 0.8V, the output voltage in the power saving mode is 0.9V, the ripple voltage on the output voltage is 20 mVp-p, the target value of the output voltage to be increased is 0.95V, and the switching frequency of the PWM signal is 1 MHz. In this case, time constants τ of the capacitor C1 and the resistor R3 are 5 ms. Further, in a case where the FET switch 49A is off, when electric charge is sufficiently stored in the capacitor C1, a voltage V3 between the terminals of the resistor R4 and the capacitor C1 is 0.8V (=Vout×R2/(R1+R2)) which is the same as the voltage of the input terminal FB. In a case where the FET switch 49A is turned on, the electric charge in the capacitor C1 is gradually discharged through the resistor R3, and, when about 20 ms have elapsed, the voltage V3 becomes 0.16V by dividing 0.8V by the resistor R3 and the resistor R4, as shown in FIG. 7A. In this period of 20 ms, the output voltage gradually increases from 0.9V to 0.95V with stability.

Since the switching frequency of the PWM signal is 1 MHz, the switching circuit 37 performs switching 20000 times in 20 ms. Therefore, the duty ratio of the PWM signal is increased by 0.00005 in each switching. This is much less than 0.5% that is a variation of the duty ratio in typical DC/DC converters. Therefore, influence on the output voltage due to the feedback voltage adjustment circuit 49 being provided can be ignored.

Further, the ripple voltage of 20 mVp-p on the output voltage is divided by the voltage dividing resistor R1 and the voltage dividing resistor R2, to become 17 mV at the input terminal FB. The time constants τ of the resistor R4 and the capacitor C1 are 20 ms, and the switching frequency of the PWM signal is 1 MHz. Therefore, according to a general relational expression representing a relationship among the time constant τ, the time t, and the voltage V(t), a voltage that is applied between the terminals of the resistor R4 and the capacitor C1 in 1 μs due to the ripple voltage of the input terminal FB, is 1.8 μV. This voltage is very low as compared to a variation (±0.05V) in threshold value at the input terminal FB in typical DC/DC converters. Therefore, influence on the output voltage due to the feedback voltage adjustment circuit 49 being provided can be ignored.

Figure 6A:
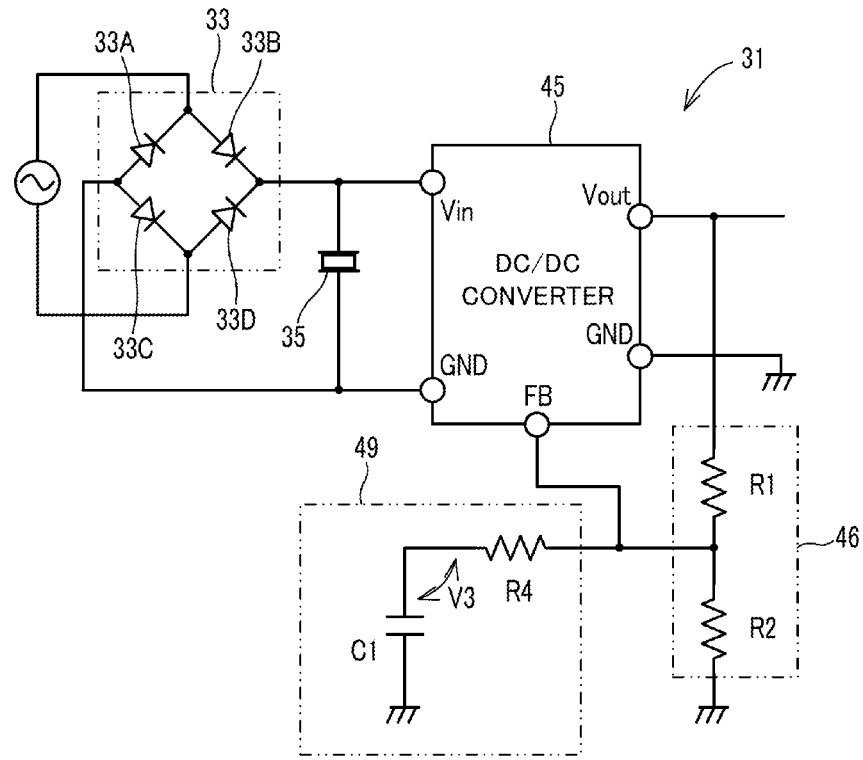
FIGS. 6A and 6B illustrate an equivalent circuit of the feedback voltage adjustment circuit in the power supply circuit shown in FIG. 3, and an output voltage waveform.
Figure 6B:
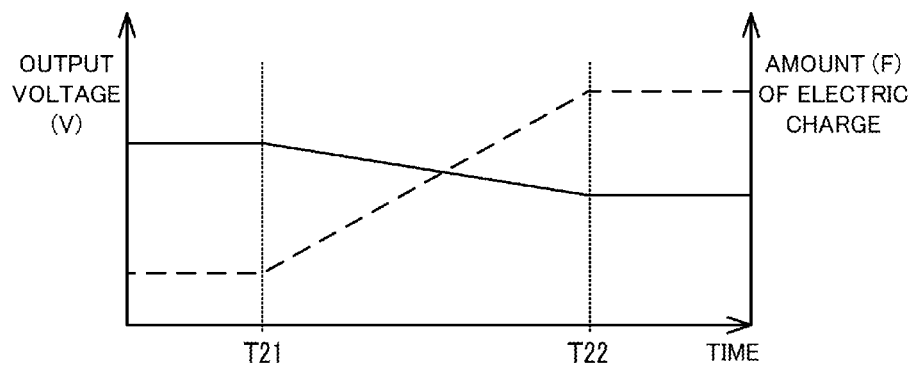

On the other hand, when a LOW level gate signal is inputted to the gate terminal of the FET switch 49A from the power supply control portion 62, the FET switch 49A is turned off, and the feedback voltage adjustment circuit 49 forms a part of an RC circuit (RC filter) including the voltage dividing resistor R1, the resistor R4, and the capacitor C1, as indicated in the equivalent circuit in FIG. 6A. Thus, electric charge is gradually stored in the capacitor C1 through the voltage dividing resistor R1 and the resistor R4. At this time, a rate at which the electric charge is stored in the capacitor C1 is determined according to a time constant of the RC circuit. Thus, as shown in FIG. 6B, in a time period from time T21 to time T22, the feedback voltage inputted through the input terminal FB is gradually slowly increased, to finally converge to a voltage obtained by division by the voltage dividing resistor R1 and the voltage dividing resistor R2. On the other hand, the output voltage is slowly reduced with stability.

Figure 7B:
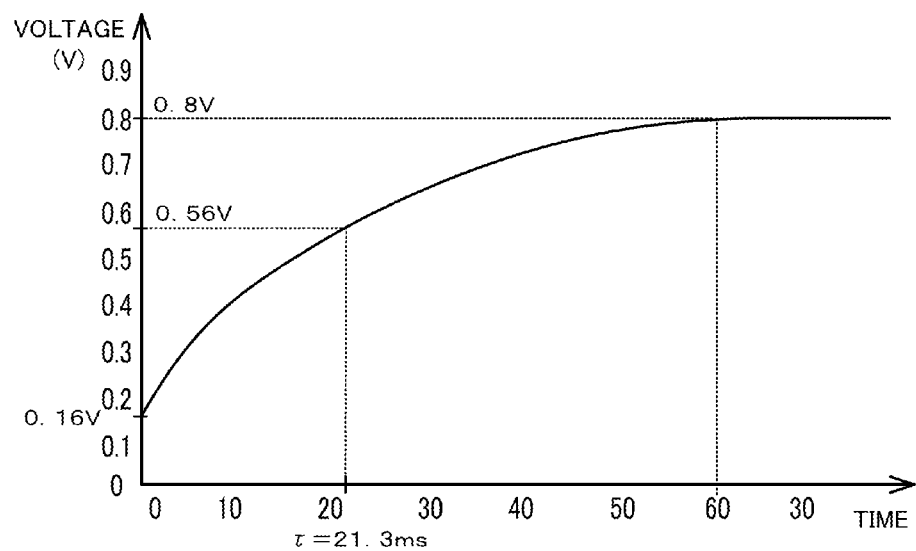

Similarly to the above-described example, another example is assumed where the input voltage of the DC/DC converter 45 is 5V, the value of the voltage dividing resistor R1 is 13 kΩ, the value of the voltage dividing resistor R2 is 100 kΩ, the value of the resistor R3 is 50 kΩ, the value of the resistor R4 is 200 kΩ, the capacitor C1 is 0.1 μF, the reference voltage Vref is 0.8V, the output voltage in the normal operation mode is 0.95V, the ripple voltage on the output voltage is 20 mVp-p, the target value of the output voltage to be reduced is 0.9V, and the switching frequency of the PWM signal is 1 MHz. In this case, the time constant τ of the RC circuit (RC filter) including the voltage dividing resistor R1, the resistor R4, and the capacitor C1, is 21.3 ms. Further, in a case where the FET switch 49A is on, when the capacitor C1 is fully discharged, the voltage V3 between the terminals of the resistor R4 and the capacitor C1 is 0.16V. In a case where the FET switch 49A is turned off, electric charge is stored in the capacitor C1 through the voltage dividing resistor R1 and the resistor R4, and, when about 60 ms have elapsed, the voltage V3 becomes 0.8V, as shown in FIG. 7B. In this period of 60 ms, the output voltage is gradually reduced from 0.95V to 0.9V with stability.

Since the switching frequency of the PWM signal is 1 MHz, the switching circuit 37 performs switching 60000 times in 60 ms. Therefore, the duty ratio of the PWM signal is increased by 0.000017 in each switching. This is much less than 0.5% that is a variation of the duty ratio in typical DC/DC converters. Therefore, influence on the output voltage due to the feedback voltage adjustment circuit 49 being provided can be ignored.

Further, the ripple voltage of 20 mVp-p on the output voltage is divided by the voltage dividing resistor R1 and the voltage dividing resistor R2, to become 17.7 mV at the input terminal FB. The time constants τ of the resistor R4 and the capacitor C1 are 20 ms, and the switching frequency of the PWM signal is 1 MHz. Therefore, according to the relational expression representing a relationship among the time constant τ, the time t, and the voltage V(t), a voltage that is applied between the terminals of the resistor R4 and the capacitor C1 in 1 μs due to the ripple voltage of the input terminal FB, is 1.8 μV. This voltage is very low as compared to a variation (±0.05V) in threshold value at the input terminal FB in typical DC/DC converters. Therefore, influence on the output voltage due to the feedback voltage adjustment circuit 49 being provided can be ignored.

As described above, in the embodiment described above, since the feedback voltage adjustment circuit 49 is provided, when the output voltage is increased to the target value, the feedback voltage of the input terminal FB can be gradually reduced by a predetermined amount. Thus, a difference between the reference voltage Vref and the feedback voltage is not abruptly increased but gradually increased, and feedback control is performed based on the difference, whereby output voltage is gradually increased. As a result, since the output voltage is not abruptly increased, overshoot does not occur in the output voltage, and the output voltage is stable. On the other hand, when the output voltage is reduced to the target value, the feedback voltage can be gradually increased by a predetermined amount. Thus, a difference between the reference voltage Vref and the feedback voltage is not abruptly reduced but gradually reduced, and the feedback control is performed based on the difference, whereby the output voltage is gradually reduced. As a result, since the output voltage is not abruptly reduced, undershoot does not occur in the output voltage, and the output voltage is stable.

In the above-described embodiment, an exemplary case is described in which the NIC 18 is provided. In the multifunction peripheral in which the NIC 18 is not used, when a copy instruction is inputted from the operation display portion 16, a signal indicating that the copy instruction has been inputted, instead of the reception signal, may be inputted to the power supply control portion 62.

Further, in the above-described embodiment, an exemplary case is described in which the present disclosure is applied to control of a voltage outputted to the drive portion 24 such as the image forming portion 12 and the image reading portion 10. In particular, when the present disclosure is applied to reduction of a voltage outputted to the main control portion 20 in the power saving mode, a core voltage of the CPU of the main control portion 20 can be reduced, to reduce heat-emission from the CPU and simultaneously reduce power consumption of the CPU itself.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A power supply apparatus comprising;
a feedback control circuit configured to perform feedback control such that a feedback voltage obtained from an output voltage conforms to a predetermined reference voltage, based on a difference between the feedback voltage and the reference voltage;
a power supply switching portion configured to supply power by switching between a power saving mode in which power is supplied to a part of a plurality of load devices and a normal operation mode in which power is supplied to the plurality of load devices; and
a feedback voltage adjustment circuit configured to gradually reduce the feedback voltage by a predetermined amount when the power supply switching portion switches from the power saving mode to the normal operation mode, and gradually increase the feedback voltage by the predetermined amount when the power supply switching portion switches from the normal operation mode to the power saving mode.

2. The power supply apparatus according to claim 1, further comprising a switching circuit configured to output power to a power supply path for the load devices by being controlled so as to be on or off based on a switching control signal having a cycle, wherein
the feedback voltage adjustment circuit reduces or increases the feedback voltage by the predetermined amount over a time period longer than or equal to the cycle of the switching control signal.

3. The power supply apparatus according to claim 1, further comprising a voltage dividing circuit configured to divide the output voltage, to output the result as the feedback voltage, wherein
the feedback voltage adjustment circuit includes:
a first resistor element connected in a path on a secondary side of the voltage dividing circuit so as to be in series with the voltage dividing circuit;
a capacitor element connected between the first resistor element and a reference potential;
a second resistor element connected in parallel with the capacitor element and connected to the first resistor element; and
a switching element connected between the second resistor element and the reference potential,
the power supply apparatus further comprising a driving signal output portion configured to output a driving signal to the switching element when the power saving mode is switched to the normal operation mode.

4. An image forming apparatus comprising:
a power supply apparatus configured to control an output voltage based on a difference between a predetermined reference voltage and a feedback voltage obtained from the output voltage, and
an image forming portion configured to perform image formation on a recording medium, wherein
the power supply apparatus includes:
a feedback control circuit configured to perform feedback control such that a feedback voltage obtained from an output voltage conforms to a predetermined reference voltage, based on a difference between the feedback voltage and the reference voltage;
a power supply switching portion configured to supply power by switching between a power saving mode in which power is supplied to a part of a plurality of load devices and a normal operation mode in which power is supplied to the plurality of load devices; and
a feedback voltage adjustment circuit configured to gradually reduce the feedback voltage by a predetermined amount when the power supply switching portion switches from the power saving mode to the normal operation mode, and gradually increase the feedback voltage by the predetermined amount when the power supply switching portion switches from the normal operation mode to the power saving mode.

5. The image forming apparatus according to claim 4, further comprising a switching circuit configured to output power to a power supply path for the load devices by being controlled so as to be on or off based on a switching control signal having a cycle, wherein
the feedback voltage adjustment circuit reduces or increases the feedback voltage by the predetermined amount over a time period longer than or equal to the cycle of the switching control signal.

6. The image forming apparatus according to claim 4, further comprising a voltage dividing circuit configured to divide the output voltage, to output the result as the feedback voltage, wherein
the feedback voltage adjustment circuit includes:
a first resistor element connected in a path on a secondary side of the voltage dividing circuit so as to be in series with the voltage dividing circuit;
a capacitor element connected between the first resistor element and a reference potential;
a second resistor element connected in parallel with the capacitor element and connected to the first resistor element; and
a switching element connected between the second resistor element and the reference potential,
the image forming apparatus further comprising a driving signal output portion configured to output a driving signal to the switching element when the power saving mode is switched to the normal operation mode.

* * * * *